United States Patent [19]

Suzuki

[11] 4,050,945

[45] Sept. 27, 1977

[54] HEAT-SENSITIVE COLOR-PRODUCING COMPOSITIONS AND ARTICLES USING SAME

[76] Inventor: Yoshio Suzuki, 2-1438 Owada-cho, Omiya, Saitama, Japan

[21] Appl. No.: 486,299

[22] Filed: July 8, 1974

[51] Int. Cl.$^2$ .................. C09D 11/02; C09D 11/12
[52] U.S. Cl. ........................ 106/21; 106/24; 106/26; 106/27; 106/31; 106/272; 428/307; 428/913
[58] Field of Search ............... 117/36.8; 106/243, 21, 106/27, 31, 308 Q, 308 F, 272; 428/913, 307, 537, 9.3, 106; 427/150, 145, 151, 148; 252/316, 62.1; 282/27.5

[56] References Cited

U.S. PATENT DOCUMENTS

| | | | |
|---|---|---|---|
| 2,748,024 | 5/1956 | Klimkowski | 106/21 |
| 2,929,736 | 3/1960 | Miller | 282/27.5 |
| 3,016,308 | 1/1962 | Macaulay | 106/31 |
| 3,168,864 | 2/1965 | Brandl | 117/36.8 |
| 3,260,613 | 7/1966 | Otto | 428/488 |
| 3,442,682 | 5/1969 | Fukaua | 428/913 |
| 3,560,229 | 2/1971 | Farnham | 106/21 |
| 3,576,660 | 4/1971 | Bayless et al. | 428/307 |

FOREIGN PATENT DOCUMENTS

| | | | |
|---|---|---|---|
| 1,046,212 | 10/1966 | United Kingdom | 117/36.8 |

*Primary Examiner*—Theodore Morris

[57] ABSTRACT

A heat-sensitive, color-producing composition comprising at least one metallic compound and at least one chelating agent, said metallic compound and chelating agent being separated from each other by including either or both of them, separately, into a heat-fusible material, said heat-fusible material being capable of being fused when said composition is heated, thereby producing a color by chelation of said metallic compound with said chelating agent. The compositions can be used to prepare heat-sensitive recording members by dispersing them into a suitable binder and then coating onto a suitable base support. The compositions can be also used to prepare heat-sensitive paints.

9 Claims, No Drawings

HEAT-SENSITIVE COLOR-PRODUCING COMPOSITIONS AND ARTICLES USING SAME

BACKGROUND OF THE INVENTION

The present invention relates to a heat-sensitive, color-producing composition which is especially suitable for making heat-sensitive recording members and paints, and more paticularly to a composition containing a metallic compound and chelating agent capable of being chelated with a metal in said metallic compound, in which both components are separated from each other by including either or both of them into a heat-fusible material.

Several attempts have been made to prepare heat-sensitive recording members. One of them comprises mixing two substances which chemically react with each other when heated, dispersing the mixture into a suitable binder and then coating the dispersion onto a sheet like material. Another attempt comprises dispersing two substances, separately, into suitable binders and then coating two dispersions successively onto a sheet-like material, or providing two dispersions, coating the dispersions onto two separaate sheet-like materials and then combined the two coated materials to make a recording member, whereby said two substances are separated from each other and thus discoloration due to spontaneous chemical reactions is avoided.

However, the recording members thus prepared have suffered considerable discoloration on their surface with the lapse of time and could not attain their objects. Thus, even if such heat-sensitive recording members were exposed to heat through an original to obtain an image thereon, contrast of the image was poor and this was a great impediment in the reading of the recorded article. It was also impossible to semipermanently preserve the recorded article as it is.

BRIEF SUMMARY OF THE INVENTION

It is an object of the present invention to provide heat-sensitive, color-producing compositions which produce a clear color when heated. Another object of the present invention is to provide such compositions which are especially suitable for making heat-sensitive recording members and paints. It is also an object of the present invention to provide heat-sensitive recording members which produce a sharp, clear and semipermanent image or color and thus have excellent storage stability before and after recording,. A further object of the present invention is to provide a process for preparing such heat-sensitive recording members using the heat-sensitive, color-producing compositions as mentioned above. Another object is to provide heat-sensitive paints. These and other objects of the present invention will be apparent from the following detailed disclosure.

Broadly, the present invention involves a heat-sensitive, color-producing composition comprising at least one metallic compound and at least one chelating agent capable of chelating with a metal in said metallic compound, said metallic compound and said chelating agent being separated from each other by including either or both of them, separately, into a material which does not fuse unless heated to from 60° to 150° C, said heat-fusible material being capable of being fused when said composition is heated to from 60° to 150° C thereby producing a color by chelation of said metallic compound with said chelating agent. Thus, in such composition the metallic compound and chelating agent are permanently separated from each other and do not react with each other unless heated to from 60° to 150° C. Further, in contrast to the prior art compositions in which chemical reactive components are separated from each other only with a binder, in the heat-sensitive color-producing composition of the present invention the reactive components are included or encapsulated into a material which does not fuse unless heated to from 60° to 150° C, and thus remain in the separated state so long as the material is not fused.

Such compositions can be used to prepare a heat-sensitive recording member by dispersing into a suitable binder to form a dispersion and then coating the dispersion onto a suitable base support to form a heat-sensitive recording member. When the binder has an ability to form a self-supporting film or sheet after molding, a self-supporting recording member can be made by only molding the dispersion into a film or sheet. The heat-sensitive recording members thus obtained produce clear, sharp and semipermanent colors or images thereon when heated. The recording members of the present invention have excellent storage stability before and after recording.

The compositions of the present invention can be used to prepare a heat-sensitive paint which is called "thermopaint".

DETAILED DESCRIPTION OF THE INVENTION

In general, the metallic compounds used in the heat-sensitive, color-producing compositions of the present invention are those capable of chelating with chelating agent as described hereinafter thereby producing colors. Representative metallic compounds are salts (includng double salts and complexes) or oxyacid salts of heavy metals such as Cu, Ag, Au, Mg, Cr, Sr, Ba, Zn, Cd, Hg, Al, Tl, Ti, Sn, Pb, Sb, Bi, V, Ca, Mo, W. Ge, Mn, Fe, Ni, Co, and the like. These metallic compounds may be used alone or in combination.

The chelating agents which may be used are, broadly, those having ligands which are capable of chelating with a metal in the metallic compounds as described above.

Illustrative of the chelating agents are as follows:
1. o-o'-hydroxy-azo compounds such as sodium 1-(1-hydroxy-2-naphthylazo)-6-nitro2-napthol-4-sulfonate,
    sodium 1-(2-hydroxy-1-naphthylazo)-2-naphthol-4-sulfonate,
    1-(2-hydroxy-4-sulfo-1-naphthylazo)-2-hydroxy-3-napthoic acid,
    disodium 3-(5-chloro-2-hydroxyphenylazo)-4,5-dihydroxynaphthalene-2,7-disulfonate,
    sodium salt of 4-(2-hydroxy-4-sulfonaphthylazo)-3-methyl-1-phenyl-2-pyrazoline-5-one,
    disodium 3-(2-hydroxyphenylazo)-4,5-dihydroxynaphthalene-2,7-disulfonate,
    disodium 3-(2-hydroxy-4-sulfophenylazo)-4,5-dihydroxynaphthalene-2,7-disulfonate,
    7-amino-2-(2-hydroxy-8-sulfo-1-naphthylazo)-1-naphthol-3-sulfonic acid,
    2-(2-hydroxyphenylazo)-1,5-naphthalenediol,
    2-(2-hydroxy-5-sulfophenylazo)-1,5-naphthalenediol,
    1-(2-hydroxy-4-nitrophenylazo)-2-naphthol,
    1-(2-hydroxyphenylazo)-2-naphthol,
    1-(2-hydroxy-5-sulfophenylazo)-2-naphthol, 1-hydroxy-8-(2hydroxynaphthylazo)-2-(4-sulfonaphthylazo)-3,6-naphthalene disulfonic acid,
sodium 1-[1-hydroxy-6-(2-hydroxynaphthylazo)-4-sulfo-2-phenylazo]-2-naphthol-6sulfonate,
sodium 4-hydroxy-3,5-bis(2-hydroxynaphthylazo) benzene sulfonate,
sodium 5-[1-(1,8-dihydroxy-4-sulfo-2-napthylazo)-4-naphthylazo]salicylate
sodium 1-(1-hydroxy-3,4,6-trichloro-2-phenylazo)-3-acetamido-2-naphthol-6-sulfonate,
disodium 3-phenylazo-4,5-dihydroxy-naphthalene-2,7-disulfonate,
sodium 2-(2-hydroxy-3,6-disulfo-1-naphthylazo) benzoate,
1-(4,7-disulfo-1-naphthylazo)-4-(1-hydroxy-3-sulfo-6-amino-2-naphthylazo) naphthalene,
sodium 2-(5-chlor-2-hydroxy-3-nitrophenylazo)-1-naphthol-4-sulfonate,
2-(5-chloro-2-hydroxy-3-sulfophenylazo)-1-naphthol-5-sulfonic acid,
3-(3,6-disulfo-8-hydroxynaphthylazo)-4,5-dihydroxynaphthalene-2,7-disulfonic acid,
1-(2-hydroxy-3-nitro-5-sulfophenylazo)-2-naphthol,
4-(4-nitrophenylazo) pyrocatechol,
4-(3,4-dihydroxyphenylazo) benzene sulfonic acid,
sodium 5-chloro-3-(2,4-dihydroxyphenylazo)-2-hydroxybenzene sulfonate,
sodium 5-chloro-2-hydroxy-3-(1-hydroxy2-naphthylazo) benzene sulfonate,
5-chloro-2-hydroxy-3-(2-hydroxynapthylazo) benzene sulfonic acid,
sodium 3-(8-acetamido-2-hydroxynaphthylazo)-2-hydroxybenzene sulfonate,
1-azo-2-hydroxynaphthyl-2-hydroxy-3-nitrobenzene-5-sulfonic acid, and the like;

2. o-hydroxy-azo compounds such as
1-pyridylazo-2-naphthol,
4-(2pyridylazo) resorcinol,
sodium 2-(2-hydroxy-3,6-disulfo-1-naphthylazo) benzenearsonate,
sodium 3-(2-arsonophenylazo)-4,5-dihydroxynaphthalene-2,7 -disulfonate,
disodium 3-(4-sulfophenylazo)-4,5-dihydroxynaphthalene-2,7 -disolfonate
7-(1-naphthylazo)-8-quinolinol-5-sulfonic acid,
4-(nitrophenylazo)-2-glycylmethyl-1-naphthol,
4-(nitrophenylazo)-2-N,N-di (carboxymethyl) aminomethyl naphthol, and the like;

3. phthalein, sulfophthalein and triphenylmethane type compounds such as
3,3'-bis N,N-di (carboxymethyl)aminomethyl-o-cresolphthalein, pyrocatechol sulfophthalein,
pyrogallolsulfophthalein,
dibromopyrogallolsulfophthalein,
fluoresceine bismethyliminodiacetic acid,
3,3'-bis N,N-di (carboxymethyl) aminomethyl-0-cresolsulfophthalein,
3,3'-bis N,N-di (carboxymethyl) aminomethyl thymolsulfophthalein,
disodium 2'-sulfo-3,3'-dimethyl-4-hydroxyfuchsine-5,5'-dicarboxylate,
glycine Thmol Blue,
glycine Cresol Red,
parafuchsine complexon,
Chromoxane Green GG, and the like;

4. phenolic compounds such as
pyrogallol,
3,4-dihydroxybutylphenol,
α-chloro-3,4-dihydroxyacetophenone,
catechol,
4,5-dichlorocatechol,
disodium catechol-3,5-disulfonate,
3-methylcatechol,
4-methylcatechol,
3-isopropylcatechol,
4-isopropylcatechol,
p-tert-buthylcatechol,
4-tert-octylcatechol,
3-tert-butyl-5-methylcatechol,
5-tert-butyl-3-methylcatechol,
6-tert-butyl-5-methylcatechol,
3-tert-octyl-5-methylcatechol,
3-methyl-5-tert-octylcatechol,
3,5-diisopropylcatechol,
3,6-diisopropylcatechol,
3,5-di-tert-butylcatechol,
3,4-dihydroxyphenylacetic acid,
methyl gallats,
octyl gallate,
dodecyl gallate,
cetyl gallate,
lauryl gallate,
stearyl gallate,
trihydroxyacetophenone,
tannic acid,
1,2-dihydroxynaphthalene,
2,3-dihydroxynaphthalene,
sodium 2,3-dihydroxynaphthalene-6-sulfonate,
sodium 6,7-dihydroxynaphthalene-2-sulfonate,
sodium 1,2-dihydroxynaphthalene-3,6-disulfonate,
and the like.

In the present invention, the types of the metallic compounds and the chelating agents may be freely combined thereby producing various colors.

the ratio of the metallic compound and the chelating agent in the heat-sensitive composition is in an approximately stoichiometric amount.

The heat-sensitive, color-producing composition of the present invention can be obtained by separating a metallic compound from a chelating agent with a heat-fusible material having a melting point in the range of 60° to 150° C. Such separation may be effected by including or encapsulating either or both metallic compound and chelating agent, separately, into a heat-fusible material. For example, this may be done by injecting a component compound into an atmosphere of a melted heat-fusible material and then cooling when the compound is fully included in the fusible material; or else by dispersing a component compound into a melt or solvent solution of a heat fusible material and then effecting a phase-separation to form a "pack" or capsule. Then, the pack or capsule of one component may be combined with the other green component, or alternatively the two components, each in separate capsules, may be combined to form a heat-sensitive, color-producing composition of the present invention. Other conventional separation processes may be also used.

As the heat-fusible material are particularly selected those having a melting point in the range of 60° to 150° C. Illustrative of the heat-fusible materials are paraffins such as paraffin wax (m.p. 60° - 80° C) and the like; higher fatty acids such as myristic acid, palmitic acid, stearic acid, behenic acid, lignoceric acid, arachic acid and the like; and high molecular compounds of a low polymerization degree such as polyvinyl alcohol, polyvinyl acetate, partially saponified polyvinyl acetate, polyvinyl chloride and the like.

When the heat-sensitive, color-producing composition is heated to from 60° to 150° C, the heat-fusible material in the composition fuses, and the metallic compound and chelating agent contact with each other to form a chelated compound which produces a color.

To make a heat-sensitive recording member, the heat-sensitive, color-producing composition of the present invention can be dispersed into a suitable binder with or without a solvent. The dispersion so prepared is coated onto a suitable base support by means of conventional methods such as roll coater, knife coater and the like in the form of an uniform and continuous layer. The thickness of the coating may be in general in the range 1 to 100 $\mu$, preferably 3 to 20 $\mu$, more preferably 3 to 5 $\mu$. The dispersion so prepared may be added with various additives such as pigments, dispersing agents, stabilizers and other fillers.

The binders which may be used in the present invention are conventionally used adhesive materials. Illustrative of the preferred binders are cellulose derivatives such as ethyl cellulose, butyl cellulose, nitrocellulose, cellulose acetate, cellulose propionate, cellulose acetate butyrate, hydroxymethyl cellulose and the like; vinyl resins such as polyvinyl chloride, polyvinyl acetate, vinyl chloride-vinyl acetate copolymers, ethylene-vinyl acetate copolymers, styrenic resins, acrylics and the like; phenoxy resins; phenolic resins such as phenol-formaldehyde resin, ureo-formaldehyde resins, and the like.

The solvent which may be used include aliphatic and aromatic hydrocarbons such as petroleum ether, benzine, benzene, toluene, xylene and the like; ethers such as diethyl ether and the like; ketones such as acetone, methyl ethyl ketone and the like; esters such as ethyl acetate, butyl acetate, amyl acetate and the like; alcohols such as ethanol, propanol, isopropanol, butanol and the like. These solvents may be removed by their spontaneous evaporation or vacuum evaporation.

The base support which may be used includes various natural or synthetic papers, metal plates such as aluminum plate, and various plastic films or sheets such as Myler film, polyethylene sheet and the like.

Alternatively, when the binder has an ability to form a self-supporting film or sheet, a self-supporting recording member can be made by only molding the dispersion as described above into a film or sheet.

The heat-sensitive recording members so prepared, when exposed to heat at 60° to 150° C, for example, infrared ray, through an original, produce clear and sharp colors or images corresponding to the absorbed heat. The recorded articles so obtained can be semipermanently preserved or stored without any change.

The heat-sensitive, color-producting compositions of the present invention can be dispersed into a suitable vehicle or carrier with a suitable solvent to prepare a heat-sensitive, color-producing paint which is called "thermopaint" and used as a thermoindicator. In the preparation of such paints, vehicles and solvents may be those which are used in the preparation of conventional paints. The amount of the heat-sensitive compounds may be in general from 15 to 55 % by weight, preferably from 15 to 35 % by weight of the paint. The paints may be added with various additives such as pigments, stabilizers, dispersing agent, fillers and the like.

The present invention will be described with reference to examples. Unless indicated, all parts and percentages are by weight.

EXAMPLE 1

Preparation of capsules or packs with heat fusible materials

A. 40 Parts of ethanol was added to 10 parts of stearic acid and the resulting mixture was heated to make a solution of stearic acid in ethanol. Separately, 20 parts of lauryl gallate was dissolved in 30 parts of ethanol. The solution of stearic acid in ethanol was added to the solution of lauryl gallate in ethanol and they were uniformly mixed under heating at 70° C. The resulting mixed solution was poured into a vessel and was then pressurized to above 50 atmospheres. The pressurized solution was injected into an atmosphere at −20° C from the tip of a nozzle having a diameter of 1 mm. Thereupon, capsules comprising lauryl gallate encapsulated with stearic acid solidified as fine powders and, at the same time, ethanol separated.

After fully washed with water, the solidified capsules were washed with ethanol to completely remove lauryl gallate adhering on the surface thereof. Thus, there were obtained capsules comprising lauryl gallate encapsulated with stearic acid.

B. 10 Parts of palmitic acid was dissolved in 40 parts of chloroform. Into the resulting solution was uniformly mixed and dispersed 20 parts of pyrogallol fine powders. The dispersion was spray dried under a suitable pressure. As a result, chloroform evaporated without necessity of heating so that there were obtained solids comprising pyrogallol fine powders uniformly encapsulated with palmitic acid.

The solid fine powders were throughly washed with ethanol to completely remove from pyrogallol adhering on the surface thereof.

C. Capsules were prepared in a similar process except that 20 parts of methyl gallate was used in place of 20 parts of lauryl gallate in the above (A).

D. Capsules were prepared in a similar process except that parts of sodium 1-(2-hydroxy-1-naphthylazo)-2-naphthaol-4-sulfonate was used in place of 20 parts of pyrogallol fine powders in the above (B).

E. Capsules are prepared in a similar process except that 20 parts of 1-pyridylazo-2-naphthol was used in place of 20 parts of lauryl gallate in the above (A).

F. Capsules are prepared in a similar process except that 20 parts of pyrocatechol sulfophthalein was used in place of pyrogallol fine powders in the above (B).

G. Into about 200 l of a rotary kiln (50 cm in diameter by about 100 cm in length), which is provided in the interior thereof with four impellers about 2cm by 100 cm, was charged 40 parts of paraffin wax (melting at 60° to 80° C) at 150° C. The rotary kiln was maintained at an inner temperature of 130° C, set at 1,000 RPM and hermetically sealed in the vacuum condition.

Separately, 80 parts of ferric sulfate fine powders were prepared (particle size less 5 $\mu$).

After the fine powders were injected into the rotary kiln wherein paraffin wax has been charged, the temperature of the kiln was lowered to 5° C without stopping the revolution. Thus, there were produced capsules of ferric sulfate with paraffin wax.

H. Paraffin wax capsules were prepared in a similar process except that 40 parts of sodium metavanadate and 40 parts of anhydrous sodium carbonate were used in place of 80 parts of ferric sulfate in the above (G).

I. Paraffin wax capsules were prepared in a similar process except that 40 parts of sodium tungstate and 40 parts of sodium acetate were used in place of 80 parts of ferric sulfate in the above (G).

J. Paraffin wax capsules were prepared in a similar process except that 40 parts of sodium molybdate and 40 parts of sodium acetate were used in place of 80 parts of ferric sulfate in the above (G).

EXAMPLE 2

| (a) | Product of Example 1 (A) | 25 parts |
|---|---|---|
| | Ethyl cellulose | 25 parts |
| | Acetone | 150 parts |

The above components were uniformly mixed wth a mixer to make a dispersion system.

| (b) | Sodium metavanadate | 100 parts |
|---|---|---|
| | Ethyl cellulose | 60 parts |
| | Titanium white | |
| | Acetone | 320 parts |

The above components were kneaded witha ball mill for 48 hours to make a dispersion system.

200 parts of the dispersion system of (a) was uniformly mixed with 500 parts of the dispersion system of (b). The resulting mixed system was applied to a support by a roll coater in a thickness of about 5 $\mu$. Thus, there was obtained a heat-sensitive recording member. When the recording member was exposed to heat at 60° to 150° C, a black, clear recorded pattern was obtained.

EXAMPLE 3

| (a) | Product of Example 1 (A) | 25 parts |
|---|---|---|
| | Butyl cellulose | 25 parts |
| | Acetone | 150 parts |

The above components were mixed with a mixer to make a dispersion system.

| (b) | Ferric stearate | 100 parts |
|---|---|---|
| | Butyl cellulose | 60 parts |
| | Titanium white | 20 parts |
| | Acetone | 320 parts |

The above components were kneaded with a ball mill for 48 hours to make a dispersion system.

200 parts of the dispersion system of (a) was uniformly mixed with 500 parts of the disperison system of (b). The resulting mixed system was applied to a support by a roll coater in a thickness of about 5 $\mu$. Thus, there was produced a heat-sensitive recording member. When the recording member was exposed to heat at 60° to 150° C, a black, clean recorded pattern was obtained.

EXAMPLE 4

| (a) | Product of Example 1 (B) | 25 parts |
|---|---|---|
| | Ethyl cellulose | 25 parts |
| | Acetone | 150 parts |

The above components were uniformly mixed with a mixer to make a dispersion system.

| (b) | Sodium tungstate | 50 parts |
|---|---|---|
| | Titanium white | 20 parts |
| | Ethyl cellulose | 60 parts |
| | Acetone | 320 parts |

The above components were kneaded with a ball will for 48 hours to make a dispersion system.

200 parts of the dispersion system of (a) was uniformly mixed with 500 parts of the dispersion system (b). The resulting mixed system was applied to a support by a roll coater in a thickness of about 5 $\mu$. Thus, there was obtained a heat-sensitive recording member. When the recording member was exposed to heat at 60° to 150° C, a black, clean recorded pattern was obtained.

EXAMPLE 5

| (a) | Product of Example 1 (B) | 25 parts |
|---|---|---|
| | Butyl cellulose | 25 parts |
| | Acetone | 150 parts |

The above components were uniformly mixed with a mixer to make a dispersion system.

| (b) | Ferric sulfate | 100 parts |
|---|---|---|
| | Titanium white | 20 parts |
| | Butyl cellulose | 60 parts |
| | Acetone | 320 parts |

The above components were kneaded with a ball mill for 48 hours to make a dispersion system.

200 parts of the above dispersion system of (a) was uniformly mixed with 500 parts of the above dispersion system of (b). The resulting mixed system was applied to a support by a roll coater in a thickness of about 5 $\mu$. Thus, there was obtained a heat-sensitive recording member. When the recording member was exposed to heat at 60° to 150° C, a blackish purple, clean recorded pattern was obtained.

EXAMPLE 6

| (a) | Product of Example 1 (C) | 25 parts |
|---|---|---|
| | Ethyl cellulose | 25 parts |
| | Acetone | 150 parts |

The above components were uniformly mixed with a mixer to make a dispersion system.

| (b) | Sodium molybdate | 50 parts |
|---|---|---|
| | Titanium white | 20 parts |
| | Ethyl cellulose | 60 parts |
| | Acetone | 320 parts |

The above components were kneaded with a ball mill for 48 hours to make a dispersion system.

200 parts of the dispersion system of (a) was uniformly mixed with 500 parts of the dispersion system of (b). The resulting mixed system was applied to a support by a roll coater in a thickness of about 5 $\mu$. Thus, there was produced a heat-sensitive recording member. When the recording member was exposed to heat at 60° to 150° C, a purple, clean recorded pattern was obtained.

EXAMPLE 7

| (a) | Product of Example 1 (C) | 25 parts |
|---|---|---|
| | Butyl cellulose | 25 parts |
| | Acetone | 150 parts |

The above components were uniformly mixed with a mixer to make a dispersion system.

| (b) | Sodium tungstate | 50 parts |
|---|---|---|
| | Titanium white | 20 parts |
| | Butyl cellulose | 60 parts |
| | Acetone | 320 parts |

The above components were kneaded with a ball mill for 48 hours to make a dispersion system.

200 parts of the dispersion system of (a) was uniformly mixed with 500 parts of the dispersion system of (b). The resulting mixed system was applied to a support by a roll coater in a thickness of about 5 $\mu$. There was produced a heat-sensitive recording member. When the recording member was exposed to heat at 60° to 150° C, a purple, clean recorded pattern was obtained.

EXAMPLE 8

| (a) | Product of Example 1 (D) | 25 parts |
|---|---|---|
| | Ethyl cellulose | 25 parts |
| | Acetone | 150 parts |

The above components were uniformly mixed with a mixer to make a dispersion system.

| (b) | Zinc stearate | 100 parts |
|---|---|---|
| | Titanium white | 20 parts |
| | Ethyl cellulose | 60 parts |
| | Acetone | 320 parts |

The above components were kneaded with a ball mill for 48 hours to prepare a dispersion system.

200 parts of the dispersion system of (a) was uniformly mixed with 500 parts of the dispersion system of (b). The resulting mixed system was applied to a support by a roll coater in a thickness of about 5 $\mu$. Thereby, a heat-sensitive recording member was obtained. When the recording member was exposed to heat at 60° to 150° C, a blue, clean recorded pattern was produced.

EXAMPLE 9

| (a) | Product of Example 1 (E) | 25 parts |
|---|---|---|
| | Butyl cellulose | 25 parts |
| | Acetone | 150 parts |

The above components were uniformly mixed with a mixer to prepare a dispersion system.

| (b) | Copper sulfate (anhydrous) | 100 parts |
|---|---|---|
| | Titanium white | 20 parts |
| | Butyl cellulose | 60 parts |
| | Acetone | 220 parts |
| | Isopropyl alcohol | 100 parts |

The above components was kneaded with a ball mill for 48 hours to prepare a dispersion system.

200 parts of the dispersion system of (a) was uniformly mixed with 500 parts of the dispersion system of (b). The resulting mixed system was applied to a support by a roll coater in a thickness of about 5 $\mu$. There was produced a heat-sensitive recording member. When the recording member was exposed to heat at 60 to 150° C, a blue, clean recorded pattern was obtained.

EXAMPLE 10

| (a) | Product of Example 1 (F) | 25 parts |
|---|---|---|
| | Ethyl cellulose | 25 parts |
| | Acetone | 150 parts |

The above components were uniformly mixed with a mixer to make a dispersion system.

| (b) | lead carbonate | 100 parts |
|---|---|---|
| | Titanium white | 20 parts |
| | Ethyl cellulose | 60 parts |
| | Acetone | 320 parts |

The above components were kneaded with a ball mill for 48 hours to make a dispersion system.

200 parts of dispersion system of (a) was uniformly mixed with 500 parts of the dispersion system of (b). The resulting mixed system was applied to a support by a roll coater in a thickness of about 5 $\mu$. A heat-sensitive recording member was produced thereby. When the recording member was exposed to heat at 60 to 150° C, a purple, clean recorded pattern was obtained.

EXAMPLE 11

| (a) | Solution of 5 % catechol in acetone | 50 parts |
|---|---|---|
| | Solution of 20 % vinyl chloride-vinyl acetate | |
| | copolymer resin in butyl acetate | 150 parts |

The above components were uniformly mixed with a mixer to make a dispersion system.

| (b) | Product of Example 1 (G) | 100 parts |
|---|---|---|
| | Solution of 20 % vinyl chloride-vinyl acetate copolymer in butyl acetate | 380 parts |
| | Titanium white | 20 parts |

The above components were kneaded with a ball mill for 48 hours to make a dispersion system.

200 parts of the dispersion system of (a) was uniformly mixed with 500 parts of the dispersion system of (b) amd the resulting mixed system was applied to a support by a roll coater in a thickness of about 5 $\mu$. Thus, there was produced a heat-sensitive recording member. Then the recording member was exposed to heat at 60° to 150° C, a bluish black, clean recorded pattern was obtained.

EXAMPLE 12

| (a) | Lauryl gallate | 25 parts |
|---|---|---|
| | Solution of 20 % vinyl chloride-vinyl acetate | |
| | copolymer in butyl acetate | 175 parts |

The above components were uniformly mixed with a mixer to prepare a dispersion system.

| (b) | Product of Example 1 (H) | 100 parts |
| --- | --- | --- |
| | Titanium white | 20 parts |
| | Solution of 20 % vinyl chloride-vinyl acetate copolymer resin in butyl acetate | 380 parts |

The above components were kneaded with a ball mill for 48 hours to obtain a dispersion system.

200 parts of the dispersion system of (a) was uniformly mixed with 500 parts of the dispersion system of (b) and the resulting mixed system was applied to a support by a roll coater in a thickness of about 5 μ. A heat-sensitive recording member was obtained thereby. When the recording member was exposed to heat at 60° to 150° C, a black, clean recorded pattern was obtained.

EXAMPLE 13

| (a) | Cetechol | 25 parts |
| --- | --- | --- |
| | Solution of 20 % vinyl acetate-vinyl acetate copolymer resin in butyl acetate | 175 parts |

The above components were uniformly mixed with a mixer to make a dispersion system.

| (b) | Product of Example 1 (I) | 100 parts |
| --- | --- | --- |
| | Titanium white | 20 parts |
| | Solution of 20 % vinyl chloride-vinyl acetate copolymer resin in butyl acetate | 380 parts |

The above components were kneaded with a ball mill for 48 hours to prepare a dispersion system.

200 parts of the dispersion system of (a) was uniformly mixed with 500 parts of the dispersion system of (b) and the resulting mixed system was applied to a support by a roll coater in a thickness of about 5 μ. Thereby, a heat-sensitive recording member was obtained. When the recording member was exposed to heat at 60° to 150° C, a black, clean recorded pattern was obtained.

EXAMPLE 14

| (a) | Propyl gallate | 25 parts |
| --- | --- | --- |
| | Solution of 20 % vinyl chloride-vinyl acetate copolymer resin in butyl acetate | 175 parts |

The above components were uniformly mixed with a mixer to make a dispersion system.

| (b) | Product of Example 1 (J) | 100 parts |
| --- | --- | --- |
| | Solution of 20 % vinyl chloride-vinyl acetate copolymer resin in butyl acetate | 380 parts |
| | Titanium white | 20 parts |

The above components were kneaded with a ball mill for 48 hours to make a dispersion system.

200 parts of the dispersion system of (a) was uniformly mixed with 500 parts of the dispersion system of (b) and the resulting mixed system was applied to a support by a roll coater in a thickness of about 5 μ. Thereby, a heat-sensitive recording member was obtained. When the recording member was exposed to heat at 60° to 150° C, a purple, clean recorded pattern was obtained.

EXAMPLE 15

| (a) | Product of Example 1 (A) | 25 parts |
| --- | --- | --- |
| | Cellulose butyrate acetate | 25 parts |
| | Acetone | 150 parts |

The above components were kneaded with a ball mill for 48 hours to make a dispersion system.

| (b) | Product of Example 1 (H) | 100 parts |
| --- | --- | --- |
| | Cellulose butyrate acetate | 60 parts |
| | Titanium white | 20 parts |
| | Acetone | 320 parts |

The above components were kneaded with a ball mill for 48 hours to make a dispersion system.

200 parts of the dispersion system of (a) was uniformly mixed with 500 parts of the dispersion system of (b) and the resulting mixed system was applied to a support by a roll coater in a thickness of about 5 μ. Thus, there was produced a heat-sensitive recording member. When the recording member was exposed to heat at 60 to 150° C, a black, clean recorded pattern was obtained.

EXAMPLE 16

| (a) | Product of Example 1 (B) | 25 parts |
| --- | --- | --- |
| | 10 % emulsion of vinyl acetate | 175 parts |

The above components were kneaded with a ball mill for 48 hours to make a dispersion system.

| (b) | Product of Example 1 (G) | 100 parts |
| --- | --- | --- |
| | 10 % emulsion of vinyl acetate | 380 parts |
| | Titanium white | 20 parts |

The above components were kneaded with a ball mill for 48 hours to make a dispersion system.

200 parts of the dispersion system of (a) was uniformly mixed with 500 parts of the dispersion system of (b) and the resulting mixed system was applied to an support by a roll coater in a thickness of about 5 μ. Thereby, a heat-sensitive recording member was obtained. When the recording member was ex;posed to heat at 60° to 150° C, a bluish black, clean recorded pattern was obtained.

EXAMPLE 17

| Product of Example 1 (A) | 25 parts |
| --- | --- |
| Sodium metavanadate | 100 parts |
| Ethyl cellulose | 85 parts |
| Acetone | 470 parts |
| Titanium white | 20 parts |

The above components were uniformly mixed with a mixer without heating. There was obtained a white paint. The paint became black when it was applied to a metal plate and then heated at 60 to 150° C.

COMPARATIVE EXAMPLE

This example illustrates comparative tests between a recording member obtained according to the present invention and a prior art recording paper.

The prior art recording paper used is one obtained by applying a black coating material to the surface of a paper and then coating the coated surface thereof with a heat-fusible white material.

A. SHELF STABILITY BEFORE RECORDING

Test method: change with the lapse of time at 50° C and 80 % humidity

| The number of days Samples | 10 | 20 | 30 | 40 | 50 | 60 | 180 | 365 |
|---|---|---|---|---|---|---|---|---|
| The prior art | O | O | Δ | X | X | X | X | X |
| The present invention | O | O | O | O | O | O | Δ | Δ |

O : no change in color
Δ : slight change in color
X : whole change in color

As seen from the above table, the prior art recording member began to show slight change in color after 30 days and after 40 days became changed in color to the extent that the subsequently recorded image cannot be read.

On the other hand, the recording member of the present invention showed no change in color after 60 days and became slightly discolored after 180 days but remained in the same condition even after 365 day. Thus, the subsequently recorded image could be read without difficulty.

B. STORAGE STABILITY AFTER RECORDING (WEATHERING PROPERTIES)

Test method: change with the lapse of time at 50° C and 80 % humidity

| The number of days Sample | 10 | 20 | 30 | 40 | 50 | 60 | 180 | 365 |
|---|---|---|---|---|---|---|---|---|
| Prior art | O | O | Δ | X | X | X | X | X |
| The present invention | O | O | O | O | O | O | Δ | Δ |

O : no change in color
Δ : slight change in color
X : whole change in color

As seen from the above table, the prior art recording member began to show slight change in color after 30 days and became discolored after 40 days to the extent that the subsequently recorded image may not be read. On the other hand, the recording member of the present invention showed no change in color after 60 days and became slightly discolored after 180 days but remained in the same condition even after 365 days. Thus, the subsequently recorded image could be read without difficult.

From the above results, it can be seen that the recording member of the present invention is superior to the prior art recording member.

I claim:

1. A heat sensitive recording member comprising: a uniform mixture of a first metallic compound reactant, a second chelating compound reactant and a binder, said first and second reactants being adapted to react with one another to produce a colored chelated compound, said first and second reactants being physically separated by a heat-fusible material having a melting point of from about 60° to 150° C, at least one of said first and second reactants being encapsulated in said heat-fusible material, said heat-fusible material being of a different composition from said binder.

2. A heat sensitive recording member of claim 1 wherein the member is a self-supporting film.

3. A heat sensitive recording member of claim 1 wherein the member is a coating applied to a base support.

4. A heat sensitive color-producing system comprising:
a uniform mixture of a first metallic compound reactant and a second chelating compound reactant, said first and second reactants being adapted to react with one another to produce a colored chelated compound, said first and second reactants being physically separated by a heat-fusible material having a melting point of from about 60° to 150° C, at least one of said first and second reactants being encapsulated in said heat-fusible material, said uniform mixture being dispersed in a binder, said binder being a different material from said heat-fusible material.

5. A heat sensitive color-producing system of claim 4 wherein each of the first and second reactants is encapsulated in the heat-fusible material.

6. Method of preparing a heat sensitive color-producing system comprising:
selecting a first metallic compound reactant and a second chelating compound reactant, said first and second reactants being adapted to react together to form a colored chelated compound;
encapsulating said first reactant in a heat-fusible material having a melting point of from about 60° to 150° C; and
mixing said first and second reactants together with a binder to form a uniform mixture, said binder being a different material from said heat-fusible material.

7. Method of claim 6 including encapsulating the second reactant in a heat-fusible material having a melting point of from about 60° to 150° C prior to the mixing.

8. A heat sensitive recording member of claim 1 wherein said biner is a cellulosic derivative.

9. A heat sensitive recording member of claim 1 wherein each of said first and second reactants is encapsulated in said heat-fusible material and said binder is a cellulosic derivative material.

* * * * *